United States Patent Office 3,017,395
Patented Jan. 16, 1962

3,017,395
TETRAALKYLCYCLOBUTANE-1,3-DIAMINES AND RESINOUS POLYAMIDES THEREFROM
Edward U. Elam, Robert H. Hasek, and James C. Martin, Kingsport, Tenn., assignors to Eastman Kodak Company, Rochester, N.Y., a corporation of New Jersey
No Drawing. Filed June 29, 1959, Ser. No. 823,337
7 Claims. (Cl. 260—78)

This invention relates to the preparation of a new class of resinous linear polyamides, and more particularly to resinous high molecular weight polyamides from tetraalkylcyclobutane-1,3-diamines.

It is known that resinous linear polyamides can be prepared from various organic diamines and dicarboxylic acids or esters thereof. However, not all dicarboxylic acids give high molecular weight polyamides. For example, according to C. E. Schildknecht, "Polymer Processes," page 244, Interscience Publishers, Inc., New York (1956), short chain dibasic acids such as succinic and glutaric acids will not react with the conventional diamines to give high-molecular-weight polyamides due to the fact that the predominating reaction appears to be the formation of the imide, for example:

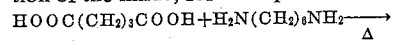
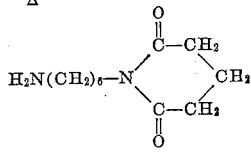

We have now discovered that 2,2,4,4-tetramethylcyclobutane-1,3-diamine is unique in being capable of condensing not only with the conventional longer chain dibasic acids and esters, but also with short chain dibasic acids such as succinic or glutaric acid or esters thereof, to give high-molecular-weight resinous polyamides that are particularly useful for the preparation of fibers and films having high softening points and possessing a high modulus of elasticity.

It is, accordingly, an object of the invention to provide a new compound, 2,2,4,4-tetramethylcyclobutane-1,3-diamine. Another object is to provide a new class of high-molecular-weight resinous polyamides from the above diamine which are characterized by possessing a high modulus. Another object is to provide high-molecular-weight polyamides from the above diamine and short chain dibasic acids such as succinic or glutaric acid which also have a high modulus. Another object is to provide processes for preparing the above-mentioned products. Other objects will become apparent hereinafter.

In accordance with the invention, we prepare the intermediate compound, 2,2,4,4-tetramethylcyclobutane-1,3-diamine, by hydrogenating the dioxime derivative of tetramethylcyclobutane-1,3-dione, in the presence of a hydrogenation catalyst such as Raney nickel, at elevated temperatures and pressures, for example, in an autoclave at about 75°–150° C. and a pressure of 2500–3500 psi. Advantageously, the hydrogen is added until no further amount is taken up. Also, the reaction is preferably carried out in an inert solvent medium such as a lower alkanol e.g. methanol, ethanol, etc. The diamine product is then recovered by conventional separation methods, for example, by filtration to remove catalyst and residues and fractional distillation of the filtrate. The reaction may be illustrated as follows:

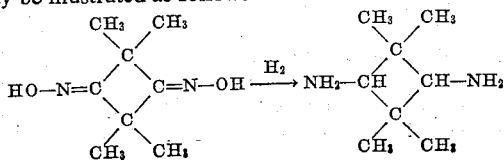

For the preparation of the polyamides of the invention, we preferably first prepare a salt of the above-described diamine with a suitable dibasic acid, and then heat the salt at 180°–300° C. for several hours. The first stage of the heating is preferably carried out under pressure to prevent the escape of volatile reactants, while the final stage is carried out in the melt or in the solid phase at atmospheric pressure in an inert atmosphere such as nitrogen or under vacuum. Advantageously, a solvent such as cresol or xylenol may be employed in the initial stages of heating the salt, which subsequently is removed under vacuum and the polymer build-up finished under high vacuum and temperature. In the case of the solid phase technique, a prepolymer is first formed. This is then pulverized and heated for a number of hours at a temperature below its melting point. In the above-described techniques, the reactants can be present as a salt of the diacid with the said diamine, or as a mixture of carefully measured stoichiometric amounts of the diacid and the diamine. Esters of the acids can also be employed, if desired, but the free carboxylic acids are generally preferred. Suitable dibasic acids include those represented by the following general formula:

$$HOOC-R-COOH$$

wherein R represents a branched or straight chain divalent alkylene group of from 2–10 carbon atoms e.g. $-(CH_2)_2-$, $-(CH_2)_3-$, $-(CH_2)_4-$, $-(CH_2)_7-$, $-(CH_2)_{10}-$, etc. groups, a cycloalkylene group of from 5–6 carbon atoms, e.g. $-C_5H_8-$ or $-C_6H_{10}-$, or an arylene group of from 6–7 carbon atoms e.g. a phenylene group or a tolylene group, or a $-CH_2-C_6H_4-CH_2-$ group, and the like. Typical dibasic acids of the above-defined kind include succinic acid, glutaric acid, adipic acid, sebacic acid, 3-methyladipic acid, pimelic acid, azelaic acid, sebacic acid, isosebacic acid, decanedioic acid, dodecane-1,12-dioic acid, terephthalic acid, isophthalic acid, trans-1,4-cyclohexane dicarboxylic acid, and the like. The esters of the above-mentioned acids, for example, the alkyl esters, can also be employed. The melting point of the polyamide is directly dependent upon the structure of the dibasic acid used. The choice of the dibasic acid to be used depends on the desired properties of the resulting polyamide. If extremely high modulus is desired, then the use of an alicyclic or an aromatic dibasic acid will provide that property. Of course, a polyamide with a modulus in the range of those known to the art is achieved simply by using an aliphatic dibasic acid such as defined above and 2,2,4,4-tetramethylcyclobutane-1,3-diamine.

The above-defined resinous polyamides of the invention may be represented by the following recurring structural unit:

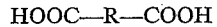
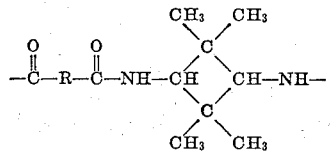

wherein R is as previously defined.

The following examples will serve to illustrate further the manner of practicing our invention.

EXAMPLE 1

A mixture of 67.0 g. (0.4 mole) of tetramethylcyclobutane-1,3-dione, dioxime [Richters Org. Chem., vol. II, page 38 (1939); Leon L. Miller (Ph. D. Thesis, Cornell University, 1937)], 500 ml. of ethanol and 20 g. of Raney nickel was added to a one-liter, high pressure, autoclave. Hydrogen was then added and the reaction was carried out at 100° C. at 3000 p.s.i., until no further hydrogen was taken up. The autoclave was cooled, vented and the contents filtered. The filtrate was distilled through a 10-inch packed column to give 32.0 g. of product B.P. 84–85° C./16 mm. This represented a yield of 58% of 2,2,4,4-tetramethylcyclobutane-1,3-diamine.

EXAMPLE 2

A solution of 7.85 g. (0.055 mole) of 2,2,4,4-tetramethylcyclobutane-1,3-diamine in 20 ml. of ethanol was added with stirring to a warm solution of 9.4 g. (0.05 mole) of azelaic acid in 40 ml. of ethanol. A white precipitate formed rapidly and the reaction mixture was heated on the steam bath for 30 minutes. After cooling, the white solid was filtered and then recrystallized from an ethanol-water mixture. This material was the salt of azelaic acid with 2,2,4,4-tetramethylcyclobutane-1,3-diamine. It had a M.P. of 198–201° C. and the following analysis:

Percent C (calculated for $C_{17}H_{34}N_2O_4$)—61.8; percent C (found)—62.01

Percent H (calculated for $C_{17}H_{34}N_2O_4$)—10.3; percent H (found)—10.39

Percent N (calculated for $C_{17}H_{34}N_2O_4$)—8.5; percent N (found)—8.29

Two g. of this salt and 2.5 ml. of cresol were heated in a small reaction flask at 180–200° C. with stirring under nitrogen for 45 minutes; then at 220–230° C. for one hour. The pressure was reduced to 30 mm. and the cresol distilled. Since the polymer turned solid when the cresol was gone, the temperature was raised to 260° C. and the pressure was lowered to 0.2–0.5 mm. After 30 minutes of this treatment, the polymer was still solid, but some solid phase molecular weight build-up had taken place. The polyamide had an inherent viscosity of 0.54 and a M.P. of 280–285° C. It gave strong fibers that had a high modulus of elasticity.

EXAMPLE 3

A solution of 8.0 g. (0.056 mole) of 2,2,4,4-tetramethylcyclobutane-1,3-diamine in 25 ml. of ethanol was added with stirring to a warm solution of 8.17 g. (0.056 mole) of adipic acid in 50 ml. of ethanol. A white precipitate formed rapidly and the reaction mixture was heated on the steam bath for 30 minutes. After cooling, the white solid was filtered and then recrystallized from an ethanol-water mixture. The product was the salt of adipic acid with 2,2,4,4-tetramethylcyclobutane-1,3-diamine. It had a M.P. of 215–218° C. and the following analysis:

Percent C (calculated for $C_{14}H_{28}N_2O_4$)—58.4; percent C (found)—58.41

Percent H (calculated for $C_{14}H_{28}N_2O_4$)—9.73; percent H (found)—9.82

Percent N (calculated for $C_{14}H_{28}N_2O_4$)—9.73; percent N (found)—9.71

Two g. of this salt and 5 drops of water were heated in an evacuated, sealed tube at 250° C. for one hour. The resulting white prepolymer was dried and ground to pass a 20-mesh screen. A solid phase polymerization was carried out by heating this material under reduced pressure (0.5 mm.) at 180–240° for one hour, then at 240° C. for two hours. The resulting polymer had an inherent viscosity of 0.55 and did not melt below 350° C. This polymer could be spun into fibers using a solvent spinning technique with formic acid as the solvent. The fibers were strong and possessed a high modulus of elasticity.

EXAMPLE 4

A salt of glutaric acid and 2,2,4,4-tetramethylcyclobutane-1,3-diamine was prepared as described in Example 2. A mixture of 3.5 g. of this salt and 3 ml. of cresol was heated in a tube at 150–190° C. under nitrogen. A clear solution resulted at 190° C., and heating was continued at 200° C. for 30 minutes, then at 220° C. for two hours. The cresol was stripped off under a pressure of 30 mm.; then the pressure was lowered to 0.5 mm. with the temperature at 240° C. These conditions were maintained for 1.5 hours. The resulting polymer had a M.P. of 245–225° C. and an inherent viscosity of 0.5. The fibers exhibited a high modulus. This polyamide also gave useful molded objects.

EXAMPLES 5–6

The following examples illustrate how the properties of polyamides derived from 2,2,4,4-tetramethylcyclobutane-1,3-diamine and dibasic acids may be modified by replacement of part of the diamine with an equimolar amount of another diamine, such as 1,6-hexanediamine, 1,4-butanediamine, 1,4-cyclohexanebis(methylamine), α,α'-xylenediamine and the like. This can be done conveniently by using mixtures of salts.

*Example 5.*—A mixture of 2.59 g. (.009 mole) of the salt of adipic acid with 1,4-cyclohexanebismethylamine, 0.29 g. (.001 mole) of the salt of adipic acid with 2,2,4,4-tetramethylcyclobutane-1,3-diamine and 5 ml. of cresol was heated in a tube to 200° C. under nitrogen for 90 min. The resulting clear solution was heated at 300° C. under a vacuum of .05 mm. for 90 min. The resulting polymer had an inherent viscosity, measured in a solvent mixture of 60 parts phenol and 40 parts tetrachloroethane, of 1.17. The melting point was above 320° C.

Polyamides were prepared under the same reaction conditions, but with different ratios of the two diamines. The compositions and properties are listed in Table 1.

*Table 1*

| Composition, Mole Percent | M.P. of Polyamide, °C. | Viscosity |
|---|---|---|
| 25% A–75% B | 310–320 | 1.02 |
| 50% A–50% B | 263–268 | .82 |
| 75% A–25% B | 320–330 | .64 |

A = salt of adipic acid with 2,2,4,4-tetramethylcyclobutane-1,3-diamine.
B = salt of adipic acid with 1,4-cyclohexanebismethylamine.

*Example 6.*—A mixture of 2.36 g. (.009 mole) of the salt of adipic acid with 1,6-hexanediamine, 0.29 g. (.001 mole) of the salt of adipic acid with 2,2,4,4-tetramethylcyclobutane-1,3-diamine and 5 ml. of cresol were heated as described in Example 4 to give a copolymer with an inherent viscosity of 1.23, M.P. 235–240° C.

A mixture containing the adipic acid salts of 2,2,4,4-tetramethylcyclobutane-1,3-diamine and 1,6 - hexanediamine in a 1:3 molar ratio was converted by a similar technique to a polyamide, inherent viscosity 1.12, M.P. 215–220° C.

While the invention has been illustrated with polyamides prepared with certain dibasic acids, it will be understood that any of the mentioned dibasic acids will give generally similar high modulus polyamides, for example, a polyamide of 2,2,4,4-tetramethylcyclobutane-1,3-diamine and succinic acid, a polyamide of the above diamine and sebacic acid, a polyamide of the above diamine and terephthalic acid, a polyamide of the above diamine and trans-1,4-cyclohexanedicarboxylic acid, etc.

Also, in place of the above diamine, there may be substituted an equivalent amount of other 2,2,4,4-tetraalkylcyclobutane-1,3-diamines wherein the alkyl groups contain from 1–4 carbon atoms, e.g. 2,2,4,4-tetraethylcyclobutane-1,3-diamine or 2,4-dibutyl-2,4-diethylcyclobutane-1,3-diamine. These intermediates can be prepared by the general methods described for the production of 2,2,4,4-tetramethylcyclobutane-1,3-diamine, e.g. by hydrogenation of the dioximes of the corresponding 2,2,4,4-tetraalkylcyclobutane-1,3-diones. The intermediate tetraalkylcyclobutanediones are prepared suitably by dimerization of the corresponding dialkylketenes or by dehydrohalogenation of the corresponding dialkylacetyl halides in aliphatic tertiary amines. All of the polyamides of the invention have a high degree of utility because they will make fibers, films and molded objects that have satisfactory melting points and have, besides the other good physical properties, the additional desirable property of high modulus of elasticity. Since short chain dibasic acids, such as succinic and glutaric acids can be employed, an economical process for obtaining high molecular weight and high modulus polyamides is thereby made available to the art. The films prepared from the polyamides by coating or extrusion techniques are transparent, tough and flexible and useful as photographic film supports. If desired, the polyamide compositions may have incorporated therein various fillers, pigments, dyes, lubricants, plasticizers, etc.

The invention has been described in detail with particular reference to preferred embodiments thereof, but it will be understood that variations and modifications can be effected within the spirit and scope of the invention as described hereinabove and as defined in the appended claims.

What we claim is:

1. The compound 2,2,4,4-tetramethylcyclobutane-1,3-diamine.

2. A resinous polyamide selected from the group consisting of (1) a polyamide of approximately equimolar proportions of 2,2,4,4-tetramethylcyclobutane-1,3-diamine and a dibasic acid represented by the following general formula:

HOOC—R—COOH wherein R represents a member selected from the group consisting of a divalent alkylene group containing from 2–10 carbon atoms, a —$C_5H_8$— group, a —$C_6H_{10}$— group, a phenylene group, a tolylene group and the group —$CH_2C_6H_4CH_2$—, and (2) a polyamide of approximately equimolar proportions of (a) a diamine mixture consisting of from 10–90 mole percent of 2,2,4,4-tetramethylcyclobutane-1,3-diamine and conversely from 90–10 mole percent of a different diamine selected from the group consisting of 1,4-butanediamine, 1,6-hexanediamine, 1,4-cyclohexane bis(methylamine) and $\alpha,\alpha'$-xylenediamine and (b) a dibasic acid selected from those represented by the above general formula.

3. A resinous polyamide of approximately equimolar proportions of 2,2,4,4-tetramethylcyclobutane-1,3-diamine and glutaric acid.

4. A resinous polyamide of approximately equimolar proportions of 2,2,4,4-tetramethylcyclobutane-1,3-diamine and adipic acid.

5. A resinous polyamide of approximately equimolar proportions of 2,2,4,4-tetramethylcyclobutane-1,3-diamine and azelaic acid.

6. A resinous polyamide of approximately equimolar proportions of 2,2,4,4-tetramethylcyclobutane-1,3-diamine and trans-1,4-cyclohexanedicarboxylic acid.

7. A resinous polyamide of approximately equimolar proportions of (a) a diamine mixture consisting of 10 mole percent of 2,2,4,4-tetramethylcyclobutane-1,3-diamine and 90 mole percent of 1,4-cyclohexanebismethylamine and (b) adipic acid.

References Cited in the file of this patent

UNITED STATES PATENTS

| | | |
|---|---|---|
| 2,631,992 | Speck | Mar. 17, 1953 |
| 2,816,926 | Smiley | Dec. 17, 1957 |
| 2,838,568 | Brust | June 10, 1958 |
| 2,865,894 | Greenberg et al. | Dec. 23, 1958 |